United States Patent Office 3,117,876
Patented Jan. 14, 1964

---

3,117,876
PRODUCT FOR PACKING VIENNA SAUSAGES
Ralph E. Triller and Virgil R. Rupp, Indianapolis, Ind., assignors to Hygrade Food Products Corporation, Detroit, Mich., a corporation of New York
No Drawing. Filed Feb. 16, 1961, Ser. No. 89,662
2 Claims. (Cl. 99—187)

This invention relates to the canning of Vienna sausage in a liquid medium, and more particularly relates to such canning in a nutritional medium that aids in preserving flavor and food value from the sausage immersed therein.

Vienna sausage is a food specialty that is understood by the buying public to be a soft, moist, short sausage that is usually packed in liquid. In texture and in general appearance, the sausages closely resemble frankfurters. This fact is recognized by the Packers Encyclopedia, published by the National Provisioner, wherein in Part 3, entitled Sausage and Meat Specialties, the chapter on frankfurters states that the meat product suitable therefor is also suitable for making Vienna sausages. The chief difference between the two products lies in the greater seasoning accorded the Vienna sausage filler and the shape and moistness of the completed sausage.

It is in these features of seasoning and moistness that the problem resides whose solution forms the basis of the present invention. Briefly, the problem has been that the soluble seasoning substances and many of the soluble proteins of the sausages tend to leach out into the packing fluid after canning. These soluble substances will hereafter be referred to as sausage attributes. This leaching causes an unpredictable end product, dependent on length of time packed before use. Quality control is thus frustrated. It further causes wasted seasoning, which leads to unnecessary expense of manufacture. Lastly, it does not sufficiently enrich the packing fluid to render it useful for any purpose, so the value of the leached substances is lost.

It is therefore an object of this invention to provide a method for canning Vienna sausage and a canned product, thereof, that prevents excessive leaching of valuable sausage attributes into the packing fluid and aids in preserving the flavor and food value of the sausage.

Another object of this invention is to provide such a method and product that allows closer quality control of the Vienna sausage "as used" as well as "as packed."

Still another object of this invention is to provide such a method and product as feature a nutritionally utilizable packing fluid that has sales appeal and that further permits utilization of the leached sausage attributes.

Yet another object of this invention is to allow economy in manufacture, together with superior quality control and salability, by the conservation and utilization of all sausage attributes that are packed.

These and further objects of this invention will become clearer as the description proceeds.

Vienna sausage is usually prepared principally from beef and pork. A typical formula follows:

| | |
|---|---|
| Beef chucks | lbs__ 25 |
| Beef plate trimmings | lbs__ 25 |
| Regular pork trimmings | lbs__ 50 |
| Salt | lbs__ 3 |
| Water or ice | lbs__ 25 |
| Seasoning, usually consisting of ground pepper, ground coriander, ground nutmeg or mace | oz__ 9 |

The meat is very finely chopped and the salt and seasoning is added during that operation. The water or ice is then added, together with approximately 1/4 oz. of sodium nitrite for color stabilization. Cereal or milk powder may be added to the mix, up to 3½% under Federal regulations. Many other formulas are used, the above being merely typical. The mix is then stuffed into casings, and smoked and cooked. The smoking and cooking impart flavoring as well as hardening of the sausage.

Heretofore the aforesaid sausages have been packed in water or brine previous to drawing a vacuum on the can and sealing. The necessity of packing in liquid follows from the moist condition and softness of the product. However, the smoked flavor, the seasoning, and the soluble proteins have leached into the packing fluid. Since the taste of the delicacy is its main selling impetus, the quality control on that feature should be strictly pursued. But this has heretofore been impossible due to the unpredictable leaching time which any particular can has encountered before being opened and used. Moreover, these valuable sausage attributes have heretofore been thrown away in weak solution in the packing fluid.

The solution of the physical and commercial and economic problem that forms the present invention comprises packing the sausages in a packing fluid that is itself nutritional, and that has sufficient concentrations of certain soluble sausage attributes, so as to hinder excessive leaching of the sausages.

The soluble protein and seasoning attributes of such a packing fluid are similar or identical to the attributes in the sausages packed therein, and consequently leaching of the sausages is held to a minimum. Moreover, any cross-transfer of packing fluid attributes to the sausages is advantageous, since the types of fluid contemplated have pleasing tastes. Such transfer would moreover be at a minimum due to the aforesaid equilibrium tendency. A final advantage resides in the fact that a packing fluid having nutritional value in itself may be used, and this fluid may be used by the consumer as seasoning or broth. The entire volume of the can is thus employed.

It has been found that the most commercial nutritional equilibrium packing fluid is beef broth or similar extract that may also contain proper seasoning or flavoring. Since the sausage attributes that are normally lost are largely soluble beef protein and seasoning the aforesaid packing fluid will have high concentrations of these attributes and thus minimize leaching.

The beef extract used for packing fluid may be prepared from cooking meat and/or bones. To this may be added commercial beef boullion. In either case, the broth should consist of those soluble beef attributes commercially recognized as beef boullion, and well known as such to those skilled in the art. It is preferable to add a small amount of seasoning to such a broth, in order to enhance equilibrium with the sausage seasoning, and to enhance the desirability of the broth itself.

The proper concentration of beef attributes and/or seasoning attributes used in the packing fluid in order to practice the present invention is determined by the equilibrium point of the sausages concerned in the volume of fluid concerned. Thus, one typical packing can is 2½ inches in height by 2½ inches in diameter, and has a capacity of 5¼ fluid ounces. About 4 ounces of Vienna sausage is packed into such a can. Thus, approximately 1¼ ounces of fluid must be added to fill the can.

Since the composition of Vienna sausages varies widely, and there is no rigorous definition of its contents, as discussed above, it cannot be stated quantitatively what the packing fluid concentration should be. Rather, in the can mentioned, one skilled in the art may tailor the packing fluid to a particular sausage formulation.

As an illustrative example of this invention, Vienna sausage is prepared in accordance with the formulation set forth in column 1. The packing solution in accordance with this invention for use with the Vienna sausages prepared as above is produced by cooking 100 pounds of beef rib bones with attached meat in 100 gallons of water for approximately 12 to 20 hours.

Ten pounds of beef extract is then added and the total brought to 100 gallons by addition of water. Approximately one-quarter pound of spice extract including pepper, coriander and mace is then added to the solution.

The Vienna sausages are then packed in a container and the above packing solution added to substantially fill the container. By virtue of the soluble protein and the soluble spices contained in the packing solution, the extraction of these items from the packed sausages is prevented.

The specific spices added to the packing solution need not be identical to those used in producing the sausage. In fact, the solution may be seasoned with pepper only. It is essential, however, to assure a concentration of soluble protein, and this is done by using beef extract or other material containing or yielding soluble protein.

In general attributes that essentially simulate those soluble attributes of the sausages, should be present in the packing fluid as packed. Their concentration should be equal to, or greater than, the equilibrium concentration of sausage attributes when packed in plain water.

What is claimed is:

1. A process for packing Vienna sausages which contain attributes in the form of soluble protein and soluble seasonings, comprising the steps of providing an aqueous packing solution comprising meat broth containing attributes which are similar to the said attributes contained in said sausages, placing said sausages in a container, and adding a given volume of said packing solution to said container, the concentration of said attributes in said packing solution being at least equal to the equilibrium concentration of said attributes when said sausages are packed in a volume of water equal to said given volume.

2. A process for packing Vienna sausages which contain attributes in the form of soluble protein and soluble seasonings, comprising the steps of providing an aqueous packing solution comprising meat broth containing attributes which are similar to the said attributes contained in said sausages, and packing said sausages in said packing solution, the concentration of said attributes in said packing solution being at least equal to the equilibrium concentration of said attributes when said sausages are packed in water.

References Cited in the file of this patent

UNITED STATES PATENTS

| | | |
|---|---|---|
| 1,545,330 | Jorn | July 7, 1925 |
| 2,366,169 | Barth | Jan. 2, 1945 |
| 2,424,536 | Mayer et al. | July 22, 1947 |

FOREIGN PATENTS

| | | |
|---|---|---|
| 326,849 | Great Britain | Mar. 21 1930 |